Dec. 13, 1955     E. H. TAYLOR     2,726,437
METHOD OF PRODUCING METAL STRUCTURES BY WELDING
Filed May 16, 1952     2 Sheets-Sheet 1
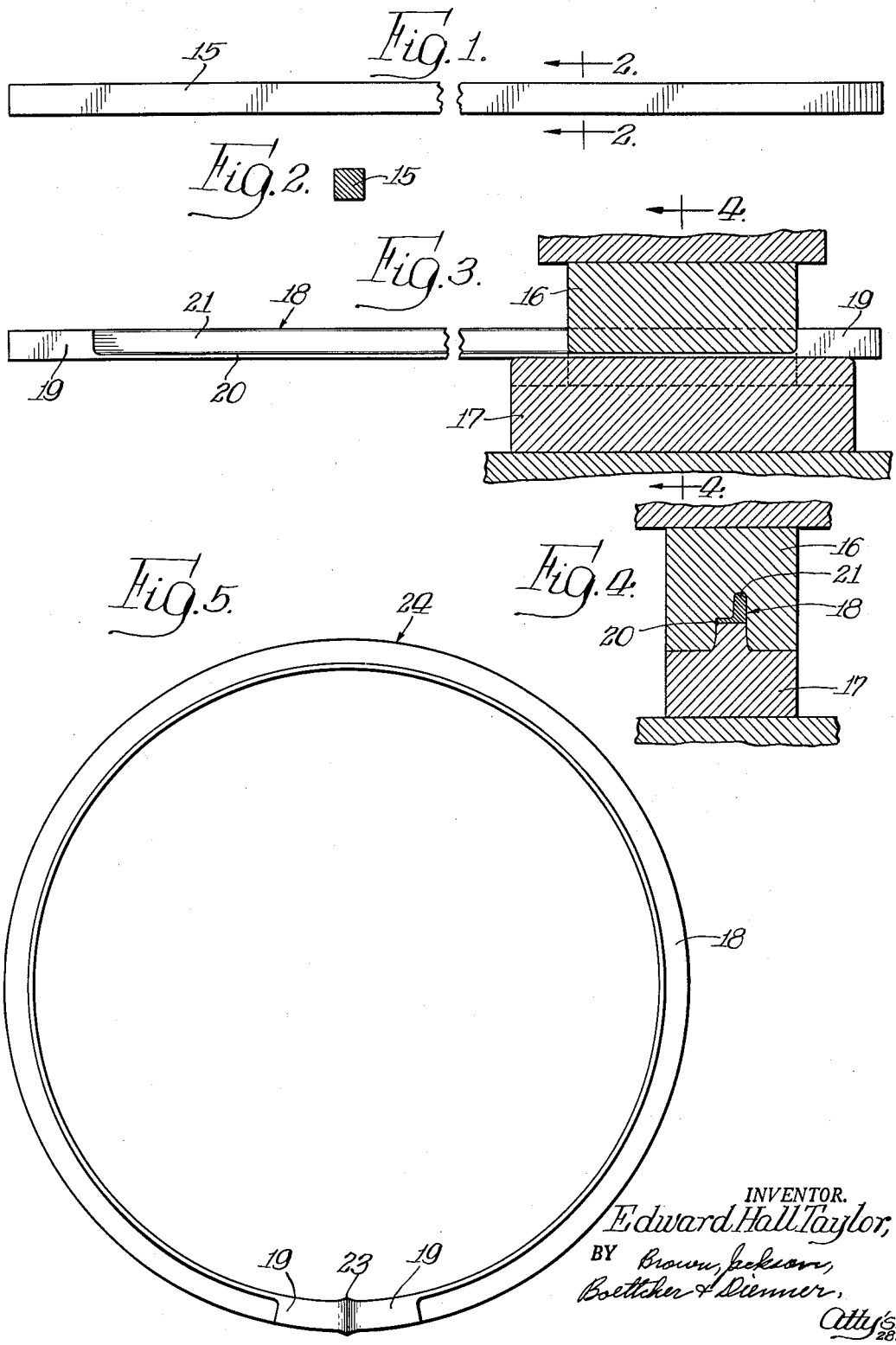
INVENTOR.
Edward Hall Taylor,
BY Brown, Jackson,
Boettcher & Dienner,
Atty's.

Dec. 13, 1955 E. H. TAYLOR 2,726,437
METHOD OF PRODUCING METAL STRUCTURES BY WELDING
Filed May 16, 1952 2 Sheets-Sheet 2
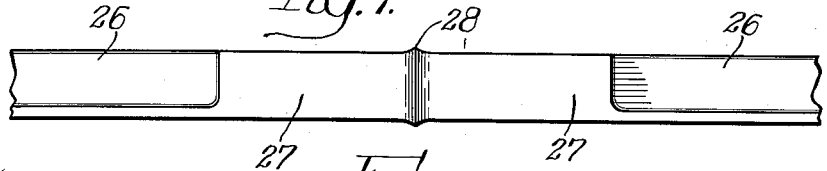
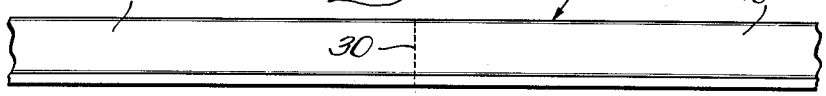
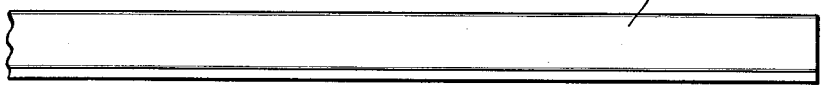
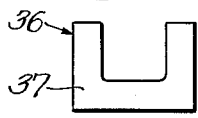
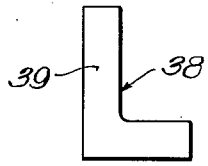
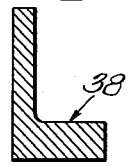
INVENTOR.
Edward Hall Taylor,
BY
Brown, Jackson, Boettcher & Dienner,
Atty's.

United States Patent Office 2,726,437
Patented Dec. 13, 1955

2,726,437

METHOD OF PRODUCING METAL STRUCTURES BY WELDING

Edward Hall Taylor, Winnetka, Ill., assignor to Taylor Forge & Pipe Works, Cicero, Ill., a corporation of Illinois Application May 16, 1952, Serial No. 288,273

3 Claims. (Cl. 29—477)

This invention relates to the production of metal structures of nonuniform cross section, and has to do with the method of producing such structures by welding.

In joining metal parts of nonuniform cross section by welding, particularly by flash welding, the thinner portions of the parts to be joined tend to burn off to a greater extent than the thicker portions, rendering it difficult to obtain a satisfactory high quality weld. The present practice, in order to avoid that difficulty, is to provide metal parts of suitable uniform cross section throughout their extent and join them together by flash welding, after which the joined parts are formed to the desired nonuniform cross section by machining or otherwise removing the surplus metal, to produce the desired structure of the desired nonuniform cross section. That is time consuming and wasteful of metal, both objectionable for obvious reasons. In structures formed of stainless steel, or of high priced alloys, the metal wasted, under the present practice referred to, is particularly objectionable because it is a serious item of expense and adds substantially to the cost of production. When less expensive metals or alloys are used, the time consumed in forming the structure, after welding, to the desired nonuniform cross section increases the cost of production to a material extent, which is objectionable.

My invention is directed to a method which avoids the above noted objections to the present practice referred to. To that end, I provide metal parts having restricted elements of uniform cross section suitable for joining by welding, the parts being of the desired nonuniform cross section throughout the remainder of their extent, join the parts by welding, preferably flash welding together the elements thereof of uniform cross section, and then form the joined welding elements to the desired nonuniform cross section, thereby completing the article with a minimum waste of metal and minimum time consumed in reforming or shaping the welded together welding elements. In practicing the method of my invention, the metal parts to be utilized in the desired structure may be initially of uniform cross section suitable for welding, throughout their extent, and may be formed to the nonuniform cross section of the desired structure except for restricted elements which remain in their initial form and provide weld elements, the latter being then joined by welding after which the weld elements are formed to the desired nonuniform cross section as above explained. Alternatively, the parts to be joined may be initially of the desired nonuniform cross section throughout their full extent and restricted portions of such parts may be formed, by upsetting or in any other suitable manner, to a uniform cross section suitable for welding, after which such welding elements are joined by welding and are then formed to the desired nonuniform cross section. In either case, waste of metal is reduced to a minimum and time consumed in forming the welded together elements to the desired nonuniform cross section is also reduced to a minimum, thus effecting a substantial saving in the cost of production as compared to the present practice above referred to.

Further objects and advantages of my invention will appear from the detail description.

In the drawings:

Figure 1 is a plan view, partly broken away, of a metal bar from which a structure of desired nonuniform cross section is to be produced;

Figure 2 is a sectional view taken substantially on line 2—2 of Figure 1;

Figure 3 is a view partly in side elevation and partly in vertical section, showing the manner in which the bar of Figures 1 and 2 is formed by forging in dies to a desired nonuniform cross section for the major portion of its length but with the terminal portions thereof remaining in their original condition to provide welding elements of similar and uniform cross section, the reformed bar being broken away and the dies being shown in vertical section;

Figure 4 is a sectional view taken substantially on line 4—4 of Figure 3;

Figure 5 is a plan view of a ring formed from the reformed bar of Figures 3 and 4, with the terminal elements thereof welded together;

Figure 6 is a fragmentary plan view of the ring of Figure 5, showing the lower portion thereof with the joined terminal elements formed to the desired nonuniform cross section of the remainder of the ring;

Figure 7 is a side view of the end portions of two angle bars similar to that of Figure 3, with terminal elements of similar and uniform cross section joined together by welding;

Figure 8 is a view like Figure 7 but with the joined terminal elements of the bars formed to the same desired nonuniform cross section as the remaining portions of the bars;

Figure 9 is a side view of an end portion of an angle bar of the desired nonuniform cross section for its full length;

Figure 10 is a view similar to Figure 9 but with the end portion of the bar formed to provide a terminal welding element of uniform cross section;

Figure 11 is an end view of a second form of bar suitable for use in practicing the method of my invention;

Figure 12 is a cross sectional view of the bar of Figure 11 taken beyond the terminal welding element thereof;

Figure 13 is an end view of a third form of bar suitable for use in practicing the method of my invention; and Figure 14 is a cross sectional view of the bar of Figure 13 taken beyond the terminal welding element thereof.

It may be assumed, for purposes of description, that it is desired to construct a metal ring of nonuniform cross section. Such a ring may readily be constructed from a metal bar such as that shown in Figures 1 and 2. Referring to those figures, I have shown a bar 15 of uniform cross section, conveniently square in cross section. The bar 15 is formed in a suitable known manner, conveniently by forging in dies 16 and 17, to provide an angle bar 18 of nonuniform cross section having restricted terminal elements 19 of slight extent relative to the length of bar 18, these elements 19 retaining the initial cross section of the bar 15 and providing welding elements of uniform cross section. As is shown more clearly in Figures 4 and 5, the bar 18, except for the terminal elements 19 thereof, is of angle cross section and has an arm 20 which is quite thin relative to the other arm 21 thereof. Such a nonuniform cross section is unsuitable for welding, particularly flash welding, due to the fact that the relatively thin arm 20 would burn away much more rapidly than the thick arm 21, as above noted.

The bar 18 of Figures 3 and 4 is bent into circular form and the terminal welding elements 19 are gripped in welding dies and are forced together under welding pressure while a welding current is passed therethrough, as is known in flash welding. The terminal elements 19 are flat sided and provide flat surfaces so that they may be effectively gripped in the welding dies as and for the purposes stated. In the welding operation the contacting ends of the elements 19 are welded together and upset to an appreciable extent as indicated at 23, thus producing the ring 24 of Figure 5. As shown, this ring 24 is of angle cross section, the cross section thereof being nonuniform except at the welding elements 19. Upon completion of the flash welding operation, the welding elements 19 are formed to the same nonuniform cross section as the remainder of the ring 24, conveniently by removal of metal by grinding, machining, or in any suitable manner. The lower portion of the finished ring then appears as in Figure 6, the ring being of the desired nonuniform cross section throughout its full extent, it being noted that the line of weld along which the parts are joined is indicated by the dotted line in Figure 6. It will be understood that the ring 24 is merely illustrative of one structure which may be produced by the method of my invention and that that method may be utilized in producing various structures of various nonuniform cross sectional shapes.

In Figures 7 and 8 I have shown the end portions of a structure produced in accordance with my invention and which may be straight lengthwise. In Figure 7 I have shown two angle bars 26 having terminal welding elements 27 of uniform and similar cross section, the cross section of the remainder of the respective bars being nonuniform. The bars 26 are joined by flash welding together the ends of the welding elements 27 with resultant upsetting of the metal at 28. The welding elements 27 are then reformed to the desired nonuniform cross section thus providing the structure 29 of Figure 8 comprising the bars 26 joined together along the weld line indicated by the dotted line 30.

Instead of starting with a metal part or bar of uniform cross section, I may start with a bar which is of the same nonuniform cross section throughout its full length as the cross section of the desired structure, such as the angle bar 32 shown fragmentarily in Figure 9. This bar 32 may be of the same nonuniform cross section as the bar 18 of Figures 3 and 4, but distinguishes therefrom in that the bar 32 is, as noted, of the desired nonuniform cross section throughout its full length. The bar 32 of Figure 9 may be upset from one end to provide the bar 33 of Figure 10, which is the same as the bar 32 of Figure 9 except that bar 33 is provided with a terminal welding element 34 of uniform cross section. In utilizing the bar 33 of Figure 10 to produce a desired structure, the terminal welding elements 34 of two or more bars like the bar 33 are joined together by flash welding, as in Figure 7, after which the welding elements of the bars are shaped to the same cross section as the remainder of those bars, thus producing a structure similar to the structure 29 shown in Figure 8.

It has been assumed, for purposes of description, that the welding elements of the parts to be joined are of rectangular or square cross section. It will be understood, however, that my invention comprehends welding elements of any suitable uniform cross section and also comprehends structures of any suitable or desired nonuniform cross section. In Figures 11 and 12 I have shown a bar 36 of channel cross section having a terminal welding element 37 of uniform cross section, the remainder of the bar being of nonuniform cross section, as shown in Figure 12. In Figures 13 and 14 I have shown an angle bar 38 having a terminal welding element 39 of uniform cross section, the remainder of this bar being of nonuniform cross section. Within the concept of my invention, the parts to be joined by welding may be originally physically separate parts or may be portions of the same member or part. Also, the welding elements of the parts to be joined need not be located at the terminals of such parts but may be disposed in any suitable relation thereto depending upon the desired structure to be produced.

The method of my invention has been described above as used for joining parts by flash welding, to which it is particularly suited. In its broader aspects, however, the method of my invention may be used for joining parts by machine welding or by hand welding. In either machine welding or hand welding it is necessary that the parts be heated to welding temperature before they can be united by being subjected to welding pressure in a welding machine or to welding by hand. There is risk, in either case, if the parts to be joined are of nonuniform cross section, that the thinner elements thereof will be burned before the thicker elements have been heated to proper welding temperature, rendering it difficult to obtain a satisfactory high quality weld. By providing the parts to be joined with weld elements of similar and uniform cross section, I avoid that difficulty and render it possible to obtain a high quality weld, particularly by flash welding but, also, by either machine welding or hand welding, which are comprehended within the method of my invention in its broader aspects.

It will be understood variations in detail may be resorted to without departing from the field and scope of my invention, and I intend to include all such variations, as fall within the scope of the appended claims, in this application in which the preferred forms only of my invention have been disclosed.

I claim:

1. The method of producing metal rings of non-uniform cross section, which comprises forging a straight metal bar of uniform cross section to the desired final non-uniform cross section of the ring between points adjacent the ends of the bar, thereby leaving terminal elements of the bar of the same uniform cross section as the original bar and of slight length relative to that of the bar, the bar throughout its extent between said terminal elements being of the desired final non-uniform cross section of the ring, bending the forged bar into ring form with the outer ends of said terminal elements seating flatwise one against the other, flash welding said terminal elements together, and removing from said joined terminal elements metal in excess of the cross section of the remainder of the ring and thereby shaping said terminal elements to the same non-uniform cross section as the forged portion of the ring.

2. The method of producing metal rings of non-uniform cross section, which comprises forming a straight metal bar to provide terminal elements of the same uniform cross section and of slight length relative to that of the bar with the portion of the bar between said terminal elements of the same non-uniform cross section as the desired final cross section of the ring, bending the formed bar into ring form with the outer ends of said terminal elements in abutting relation, welding said terminal elements together, and shaping said terminal elements to the same non-uniform cross section as the remainder of the ring.

3. The method of producing metal structures of non-uniform cross section, which comprises forging each of two straight metal parts from a point adjacent one end thereof and thereby shaping it to the desired final non-uniform cross section of the structure while providing at said one end of said part a terminal element of slight length relative to that of said part and of the same uniform cross section as the terminal element of the other of said two parts, disposing said parts with said terminal elements thereof end to end seating flatwise one on the other, joining said terminal elements by flash welding, and shaping the joined terminal elements to the same non-uniform cross section as the remainder of the respective parts.

References Cited in the file of this patent

UNITED STATES PATENTS

| Number | Name | Date |
|---|---|---|
| 403,708 | Thomson | May 21, 1889 |
| 441,276 | Bayles | Nov. 25, 1890 |
| 916,501 | Taylor | Mar. 30, 1909 |
| 992,463 | Whitaker | May 16, 1911 |
| 1,060,320 | Clark | Apr. 29, 1913 |
| 1,905,939 | Joyce | Apr. 25, 1933 |
| 1,948,793 | Lewis | Feb. 27, 1934 |
| 2,309,208 | Noble | Jan. 26, 1943 |